(12) United States Patent
Chang et al.

(10) Patent No.: US 6,681,114 B2
(45) Date of Patent: Jan. 20, 2004

(54) ON DEMAND MULTICAST MESSAGING SYSTEM

(75) Inventors: Li Fung Chang, Holmdel, NJ (US); Hui Luo, Old Bridge, NJ (US); Xiaoxin Qiu, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 560 days.

(21) Appl. No.: 09/731,345

(22) Filed: Dec. 6, 2000

(65) Prior Publication Data

US 2002/0102967 A1 Aug. 1, 2002

(51) Int. Cl.[7] .................................................. H04Q 7/20
(52) U.S. Cl. ................................ 455/456.3; 455/414.2; 379/114.13
(58) Field of Search ........................ 455/456.3, 432.1, 455/414.1, 414.2, 466, 412.1, 412.2, 414.3, 414.4; 370/432, 390, 428, 338, 347, 350; 705/26, 402, 27; 379/114.13

(56) References Cited

U.S. PATENT DOCUMENTS

| | | | | |
|---|---|---|---|---|
| 6,026,292 A | * | 2/2000 | Coppinger et al. | 455/406 |
| 6,049,711 A | * | 4/2000 | Ben-Yehezkel et al. | 455/414.3 |
| 6,108,533 A | * | 8/2000 | Brohoff | 455/414.3 |
| 6,397,040 B1 | * | 5/2002 | Titmuss et al. | 455/67.11 |
| 6,400,941 B1 | * | 6/2002 | Nara | 455/422.1 |

OTHER PUBLICATIONS http://www.near me.com/scripts/hsrun.hse/Distributed/HAHTpage/MapXtreme.Hsalcatels.run; Alcatel to Demonstrate Insight Program using NearMeWireless Application at m–Commerce 2000; Troy, NY, Sep. 13, 2000; pp. 1–2.

http://www.skygo.com/news/pr00_1218.html; Skygo Study Suggests Wireless Advertising may be Catalyst to Widespread Consumer use of Wireless Web; Redwood City, CA, Dec. 18, 2000; pp. 1–2.

http://www.wirelesstoday.com/cotm/lcomercel.htm; Privacy Concerns Plague Emerging Location Technology, Oct. 25, 2000—Wireless Data News; pp. 1–2.

http://www.cellular.co.za/news 2000/news—06192000 new_jersey_location_services.htm; GeePS Introduces Location–based Wireless Technologies on Advance Internet's New Jersey Online for Retailers and Consumers; Jun. 19, 2000; pp. 1–3.

* cited by examiner

*Primary Examiner*—Charles Appiah
*Assistant Examiner*—Nghi H. Ly

(57) ABSTRACT

An on-demand message system includes a profile proxy server and a plurality of message servers coupled to a wireless network for sending messages to mobile users under conditions specified by the users and sellers. Users provide profile information specifying categories and conditions for which they will receive messages. Sellers also provide profile information specifying conditions under which they want messages to be sent. A multicast message is sent and processed by target users in response to a predetermined event, e.g., location update, conveying information related to a seller for which the target users have expressed an interest in receiving.

18 Claims, 11 Drawing Sheets

100

100

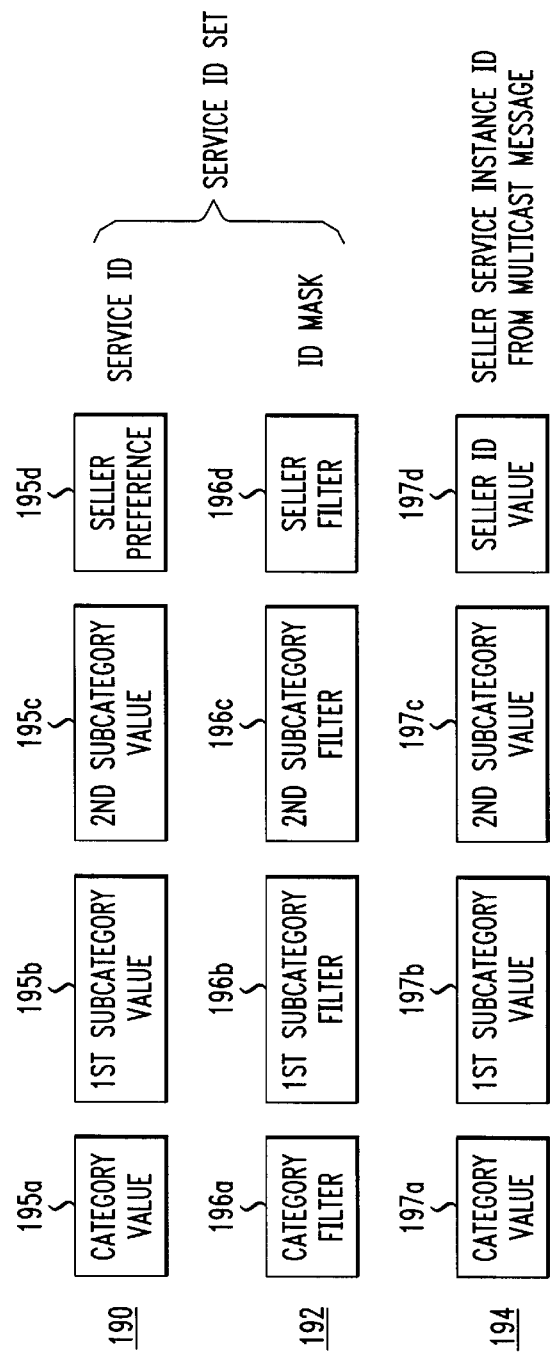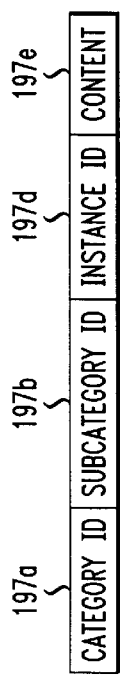

ON DEMAND MULTICAST MESSAGING SYSTEM

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication systems, and more particularly, to wireless mobile communication systems.

BACKGROUND OF THE INVENTION

There are a wide variety of advertising techniques well known in the art including radio and television commercials, newspaper advertisements, and direct marketing, e.g., telemarketing. Since such advertisements are used to convey information to as many people as possible, they can be relatively expensive and inefficient. Generally, sellers of goods and services strive to maximize their return on advertising expenditures. Sellers desire to convey knowledge of their products to as many potential consumers as possible. More particularly, sellers of various goods and services desire to contact consumers that have a desire or need for the particular goods or services provided by the seller.

However, it can be difficult and expensive to identify those consumers having an interest in a particular product or service offered by a particular seller. And even if such consumers can be identified, it can be relatively difficult to get the consumer to focus on an advertisement. In addition, consumers typically have no motivation to identify themselves as being interested in a particular type of item or service.

It would, therefore, be desirable to transmit messages to consumers that have expressed a desire or need for goods and services from sellers that provide the desired goods and services. It would further be desirable to provide messages to mobile users when they are proximate a seller for which the user desires to receive information.

SUMMARY OF THE INVENTION

The present invention provides a localized, on-demand multicast messaging system for a mobile network that provides messages to users of the mobile network. By providing messages to users of the mobile network under user-specified conditions, the user is relatively receptive to the transmitted messages. Although the invention is primarily shown and described in conjunction with a cellular telephone network transmitting commercial advertisement messages, it is understood that the invention is applicable to other messages types and other network types in which it is desirable to provide on-demand messages.

In one aspect of the invention, a mobile messaging system includes a profile proxy server coupled to a plurality of message servers. Users provide profile information to a local message server via the profile proxy server. Profile information can include preferences specified by the user defining the categories for which the user desires to receive messages and the conditions, e.g., time of day, maximum number of messages, and location, under which messages are accepted. Sellers can also provide profile information that identifies the business category of the seller and the conditions, e.g., timing, advertising range, and number of interested users, under which messages should be broadcast.

The user profile information can be used by the local message server to define a service ID pool for the user that is downloaded to user. The service ID pool allows the user to determine which multicast messages meet the user preferences specified in the user's profile. The multicast messages can be received by all users for which profile conditions and user and seller conditions are satisfied. Multicast messages include category information for the seller along with a unique identifier for the seller. The multicast messages can include information enabling users to visit or otherwise contact the seller.

In one embodiment, the user service ID pool includes pairs of service IDs and ID masks based upon the preferences specified in the user's profile. Fields in the service ID pool are compared to corresponding fields in a multicast message to determine whether the user should process the message. In an exemplary embodiment, the ID masks are logically ANDed with the multicast message and the result compared with the service ID. If the result of the logical AND matches the service ID then the message should be processed.

This arrangement allows sellers to send information regarding the goods and/or service they provide to users that have expressed a desire to receive messages from sellers providing the specified good and/or services.

Prior to broadcasting messages to mobile network users, the on-demand messaging multicast messaging system waits for an event associated with users of the system. In one embodiment, events include registration events, de-registration events, location update events, and active request events. In general, a message server receives event information, determines the type of event, and processes the event.

Registration events occur when a mobile user powers up and identifies the user to the mobile network. The on-demand messaging system retrieves the user's profile and generates a desired service ID pool for the user, which is then downloaded to the user. The desired service ID pool is utilized by the user to identify those multicast messages that should be processed by the user. De-registration events occur when a user is leaving the mobile network, such as power down.

Active request events occur when a user actively requests seller information for one or more business categories. For example, a user can submit a request to receive messages from nearby restaurants. Multicast messages can be sent to the user providing seller information when user and seller conditions are satisfied.

Location update events are triggered by movement of the user within the mobile network. In general, the mobile network informs the on-demand messaging network when a user moves from one cell to another. The messaging network then informs a message server covering the new cell of the user's location.

BRIEF DESCRIPTION OF THE DRAWINGS

The invention will be more fully understood from the following detailed description taken in conjunction with the accompanying drawings, in which:

FIG. 6 is a block diagram of an exemplary format for a desired service ID pool formed by an on-demand messaging system in accordance with the present invention;

FIG. 7 is an exemplary format for an on-demand multicast message in accordance with the present invention;

DETAILED DESCRIPTION OF THE INVENTION

Figure 1:
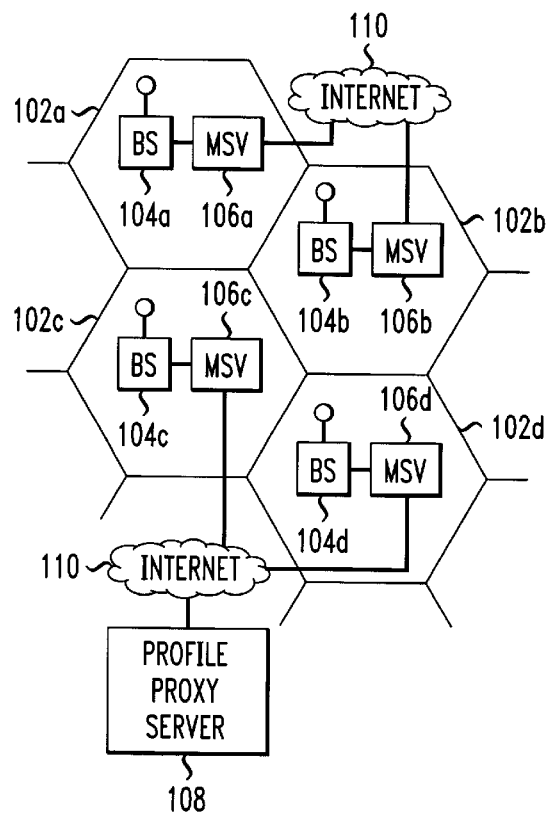
FIG. 1 is a block diagram of an exemplary wireless on demand messaging system in accordance with the present invention.
Figure 2:
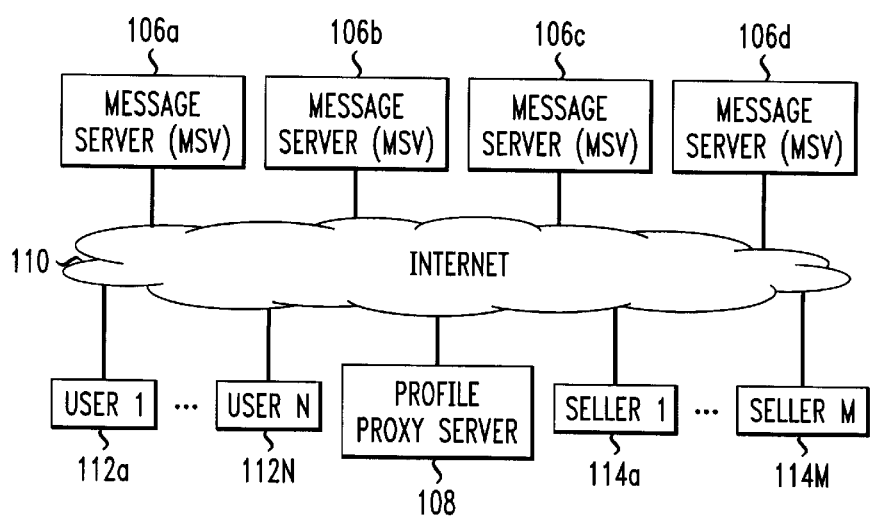
FIG. 2 is a further block diagram of an exemplary wireless on-demand messaging system in accordance with the present invention.

FIGS. 1–2 show a wireless mobile communication system 100 having on-demand messaging in accordance with the present invention. In general, the system sends messages containing seller information to mobile users based upon user location and conditions specified by users and sellers. This arrangement provides an efficient mechanism for suppliers of good and services, i.e., sellers, to contact mobile users that wish to receive messages containing information for good and services desired by the user.

In one embodiment, the mobile communication system 100 includes a plurality of cells 102a–d each served by a respective base station 104a–d in a manner well known to one of ordinary skill in the art. Each of the base stations 104a–d can be coupled to respective message server 106a–d for providing messaging instructions to the base station as described in detail below. The message servers 106 can be connected to a profile proxy server (PPS) 108 via a network 110, such as the Internet or intranet. A plurality of users 112a-N and sellers 114a-M (FIG. 2) can communicate with the profile proxy server 108 via the Internet 110, for example. The profile proxy server 108 can send the provided information to a message server 106 that is local to the user for storage in a database.

Users 112 of the system provide information to the profile proxy server 108 for defining the terms under which they are willing to accept messages from sellers 114. It is understood that the motivation for users to provide such information can vary. For example, the user can receive discounts on the fees associated with using the network, e.g., monthly cellular phone bills. The user can also receive electronic coupons when patronizing a seller in response to a message.

Figure 3:
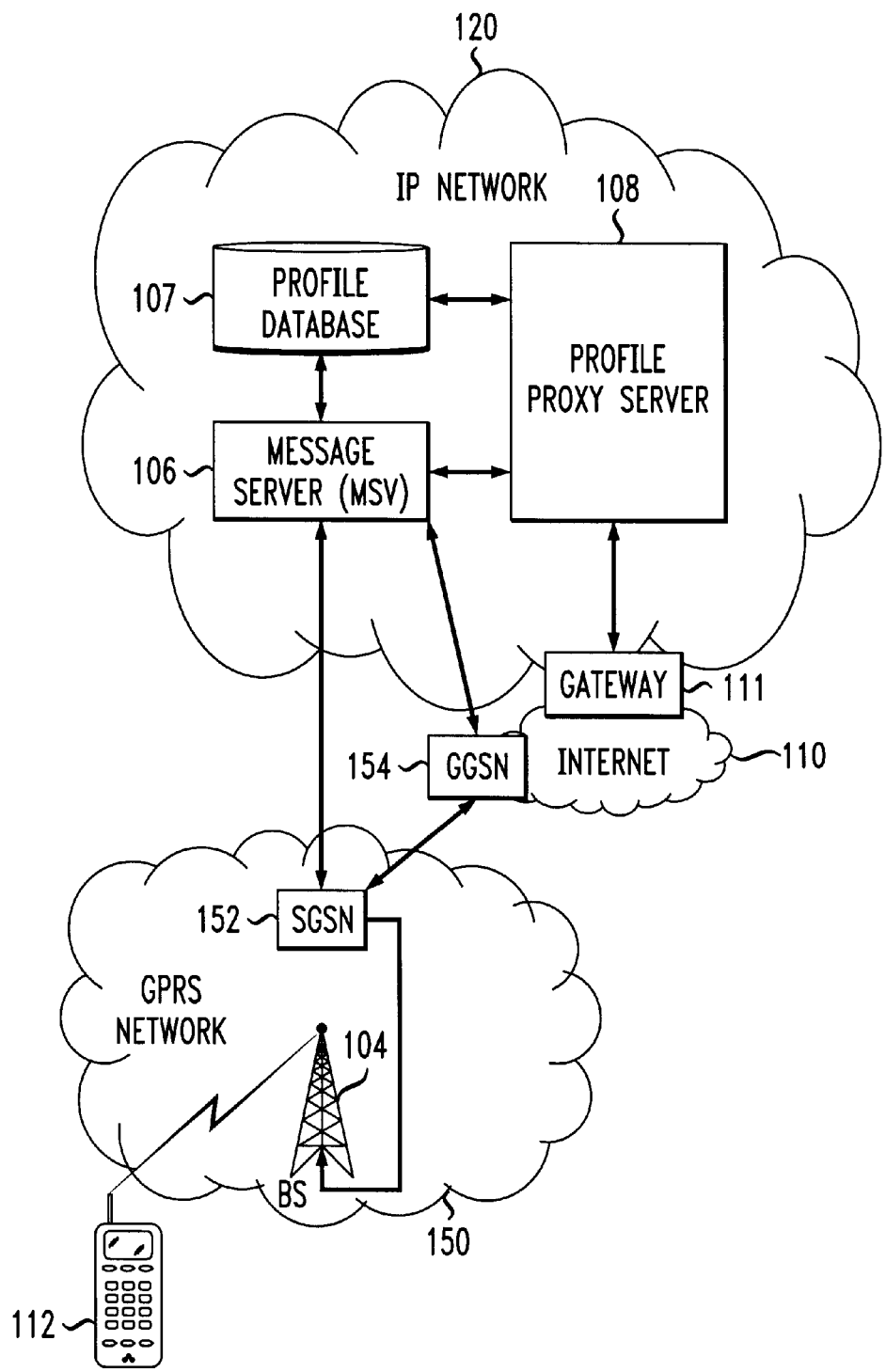
FIG. 3 is a block diagram of a particular embodiment of a wireless on-demand messaging system in accordance with the present invention.

FIG. 3 shows one particular embodiment of an on-demand messaging system 120 in accordance with the present invention that can be coupled to a General Packet Radio Service (GPRS) network 150. The on-demand messaging system 120 includes a profile proxy server 108 coupled to a message server 106 and to a profile database 107, which is also coupled to the message server. As described below, the profile database 107 can store profile data for users and sellers associated with the mobile network. The profile proxy server 108 is coupled to the Internet 110 via a conventional gateway 111. In one embodiment, one profile proxy server 108 can support a plurality of message servers 106 throughout the on-demand messaging system.

The GPRS network 150 includes a Serving GPRS Support Node (SGSN) 152 coupled to a local message server 106 and to a Gateway GPRS Support Node (GGSN) 154. The SGSN 152 communicates with a base station 104 covering the local cell 102 for providing mobile service to users 112 within the cell. The message server 106 provides message information to the local SGSN 152 for transmission by the associated base station 104.

Figure 4:
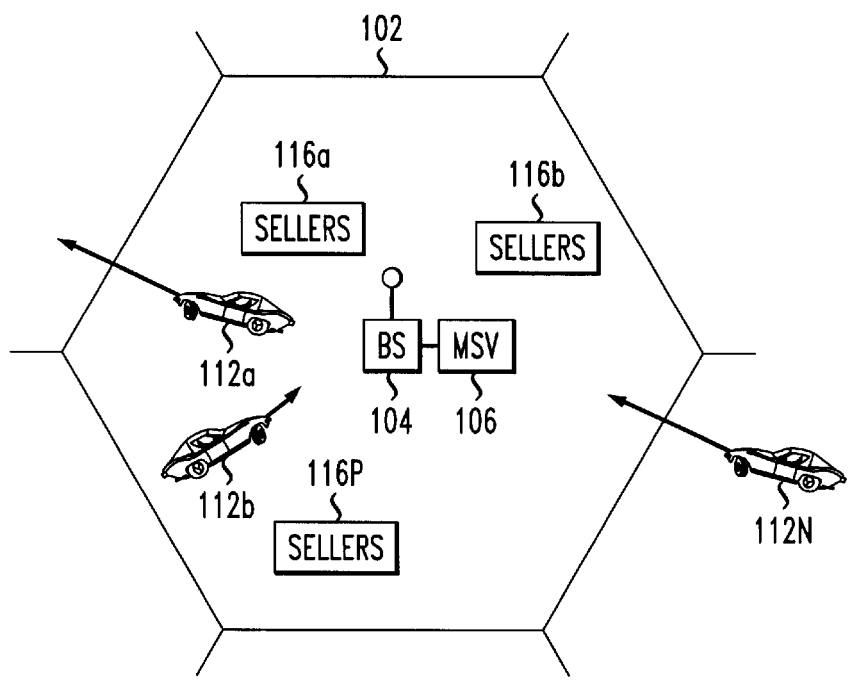
FIG. 4 is a pictorial representation of a wireless on-demand messaging system in accordance with the present invention showing user movement.

As shown in FIG. 4, mobile users 112 move within the network into and out of different cells 102. Sellers 116a-P want to contact potential users 112 that have expressed a desire for their type of goods or services. In general, sellers 116 wish to identify users proximate their location so as to maximize the likelihood that a user will visit the seller. As described below, the on-demand messaging system of the present invention can transmit multicast messages that are processed by users 112 proximate a particular seller provided that the profile conditions, e.g., type of goods, time, location, that are met by the message. The message can identify sellers and allow the user to locate and/or contact the seller(s). Sellers can specify conditions, e.g., user location, time, number of users, under which the messages should be sent, as described below.

As described above in connection with FIGS. 1–3, users 112 can provide profile information to a local message server 106 under the control of the profile proxy server 108. In one embodiment, the user 112 can provide profile information via the Internet 110 so as to maximize user convenience. The profile proxy server 108 ensures that the user profile information is stored in a profile database 107 associated with a message server 106 that is local to the user's base location, e.g., home address. As described in detail below, the base station 104 covering the user's current location transmits multicast messages that are processed by selected mobile users.

In general, users will specify profile information that limits the terms under which they receive messages automatically. An illustrative list of profile conditions include a predetermined limit of messages per unit of time, e.g., no more than three messages per hour, a predetermined time period, e.g., between three and six in the afternoon, selected days of the week, seller category, e.g., restaurant, and seller proximity, e.g., within five miles. It will be readily apparent that many more such conditions can be specified by the user. The conditions for the user can be stored in a user profile contained in a database. Table 1 below shows an exemplary user profile containing illustrative conditions for receiving messages.

| User ID | CONDITIONS | |
|---|---|---|
| | desired time to receive messages | 1–5 pm on weekends |
| | location | seller within 10 miles |
| | maximum number of messages | up to three messages per hour |
| | ring type | active |
| | first desired goods/services category | restaurants |
| | subcategory | fast food |
| | second desired goods/services category | bookstores |
| | subcategory | old books |
| | ... | |
| | Nth desired good/services category | |

Sellers can also specify conditions for broadcasting their messages. Examplary conditions include multicasting their messages only when a predetermined number of users are within a specified proximity of the seller, at certain times of the day, and certain days of the week. In addition, the seller profile can contain driving directions to the seller, business category, e.g., restaurant, and subcategories, e.g., type of food and drive through. The seller profile can further include time periods desired for message broadcasts, user distance range, type of action, e.g., send predetermined message or electronic coupon, and threshold of number of users within a local area before sending messages. The seller conditions can be stored in a seller profile database associated with a message server local to the seller.

In one embodiment, a seller can manually determine the number of users within the seller's local area that have specified the seller's category by connecting to the proxy server. For example, a seller can communicate with a local message server that provides user information to the seller. The seller can then manually send messages to users. User privacy can be maintained by protecting the actual identity of the user.

It is understood that the term "user" as used herein broadly refers to a person with a mobile phone. It is further understood that processing performed by a user refers to processing done by the user's phone.

Figure 5:
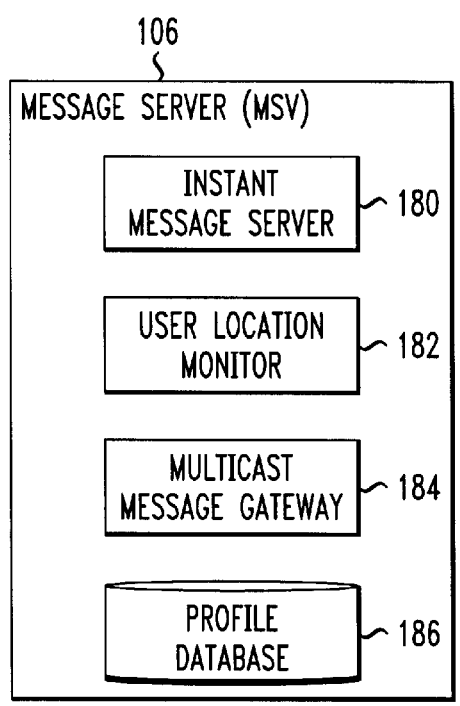
FIG. 5 is a block diagram of an exemplary message server that can form a part of a message on-demand system in accordance with the present invention.

FIG. 5 shows an exemplary embodiment of a message server, such as the message server 106 of FIGS. 1 and 2, that forms part of an mobile on-demand messaging server in accordance with the present invention. In one embodiment, the message server 106 includes an instant messaging server 180 for generating instant messages to a user in response to an active request for information from a user. The instant messaging server 150 can also include the user in a group of users to receive automatically generated messages in response to an inquiry.

The message server 106 can further include a user location monitor 182 for monitoring the location of mobile network users. As described more fully below, the user's location can be used to send information requested by the user. For so called second generation or 2G type wireless networks, the user location monitor 152 can be connected to a mobile switching center (MSC). For 3G wireless systems, the user location monitor 152 can be coupled to a Serving GPRS (General Packet Radio Service) Support Node (SGSN).

A multicast message gateway 184 delivers messages to a selected group of users via a GPRS network in a multicast format, described more fully below. Alternatively, the messages can be broadcast using conventional Short Message Service (SMS) or Cellular Digital Packet Data (CDPD) based email services.

The message server 106 can further include a profile database 186 for storing user and seller profiles. Users and sellers can modify their profile information via the profile proxy server 108 through the Internet.

In one embodiment, the user and seller profiles are stored on the message server 106 that is local to the respective user or seller. The profile proxy server 108 can contain a user-message server index. With this arrangement, in the case where a user is not within the area served by message server containing the user's profile, the profile proxy server can be queried by the message server in which the user is currently located to obtain the user's profile, as described more fully below.

In general, when a user registers with the wireless network, the local message server dynamically forms a desired service ID pool for the user based upon the business category and subcategory preferences specified in the user's profile. The service ID pool includes desired category information and corresponding mask information, as described below. The service ID pool for the user can also contain condition information from the user profile. The desired ID pool can be downloaded to the user to allow the user to process or "receive" multicast messages from sellers within the desired categories and conditions, as described below.

FIG. 6 shows an exemplary embodiment of a service ID 190 and ID mask 192 pair that provide one service ID set. A plurality of service ID sets can form a user desired service ID pool for a user. A portion of a multicast message 194 is also shown. It will be readily apparent that the size and number of the fields shown in the desired service ID pool can vary in accordance with the requirements of a particular application.

The service ID includes fields for category value 195a, first subcategory value 195b, second category value 195c, and seller ID 195d. Each field for which the user has specified a preference in the user profile contains a particular value. For example, the restaurant category can correspond to 50 H (hexadecimal notation). Fields for which the user has not specified a value are set to a default value, such as all binary ones.

The ID mask 192 includes a category filter 196a, a first subcategory filter 196b, a second category filter 196c, and a seller filter 196d. In one embodiment, the filters 196 are set to a first predetermined value if a preference for the corresponding category, subcategory, or seller is specified and a second predetermined value if a preference is not specified. In one particular embodiment, the filters 196 are set to all binary ones in the case where a preference is specified by the user and all binary zeroes where a preference is not specified.

The multicast message broadcast by a base station can have a variety of formats that contain identifying information, data, and seller category information 197a–d. FIG. 7 shows an exemplary multicast message in accordance with the present invention. The message includes a category ID 197a, a first subcategory ID 197b, and instance or seller ID 197d, and content 197e.

The user extracts information from the multicast message to fill the category 197a, first subcategory 197b, second subcategory 197c, and seller ID 197d values in the seller service instance ID. It is understood that each field 197 has a predetermined value corresponding to the particular category and subcategory to which the seller belongs. The seller ID value 197d is a value that uniquely identifies each seller.

In general, the user's desired service ID pool is utilized by the user to determine which multicast messages should be processed or "received" by the user. It is understood that specifying fewer preferences results in a user receiving more messages. For example, a user that only specifies a preference for a category 195a and first subcategory 195b can receive all messages from sellers meeting the specified preferences. A user that specifies a preference for category 195a, first subcategory 195b, second subcategory 195c and seller 195d limits messages to sellers that meet the category, subcategory, and seller criteria.

In an exemplary embodiment, the user logically ANDs the seller service instance ID 197 from a multicast message and the user ID mask 196 upon receiving the multicast message. ID mask filter 197 values having all ones result in the message value passing through the filter. For example, the category value 197a in the seller service instance ID passes through a category filter 196a that is all ones. A second subcategory value 195c, as well the second category filter 196c, in the user service ID are all zeroes when the user has not specified a preference for the second subcategory within the business category.

The result of the logical AND of the service instance ID 197 from the multicast message and the ID mask 196 is then compared to the service ID 195. If they match then the multicast message is "received" and processed by the user. Thus, unfiltered service ID values 195 must match the values in the seller service instance ID 197. Filtered values are considered to match since unspecified service ID values are binary zeroes. That is, unspecified category information does not operate to prevent the user from receiving messages.

The received or processed messages can take a variety of forms. Exemplary messages types include web-based hyper text markup language (HTML), wireless application protocol (WAP)-based wireless markup language (WML), ASCII text and other suitable formats that can be handled by the mobile phone. Further formats, including those which may be developed in the future, will be readily apparent to one of ordinary skill in the art.

The messages can be active, i.e., ring the user's phone, or passive, i.e., stored silently in the user's phone. Passive messages are displayed when the user activates the phone, such as by pressing a key. In one embodiment, the seller can specify, such as in the seller's profile, whether messages should be active or passive. The user can disable active messages such that they are treated as passive messages, i.e., stored silently.

Figure 8:
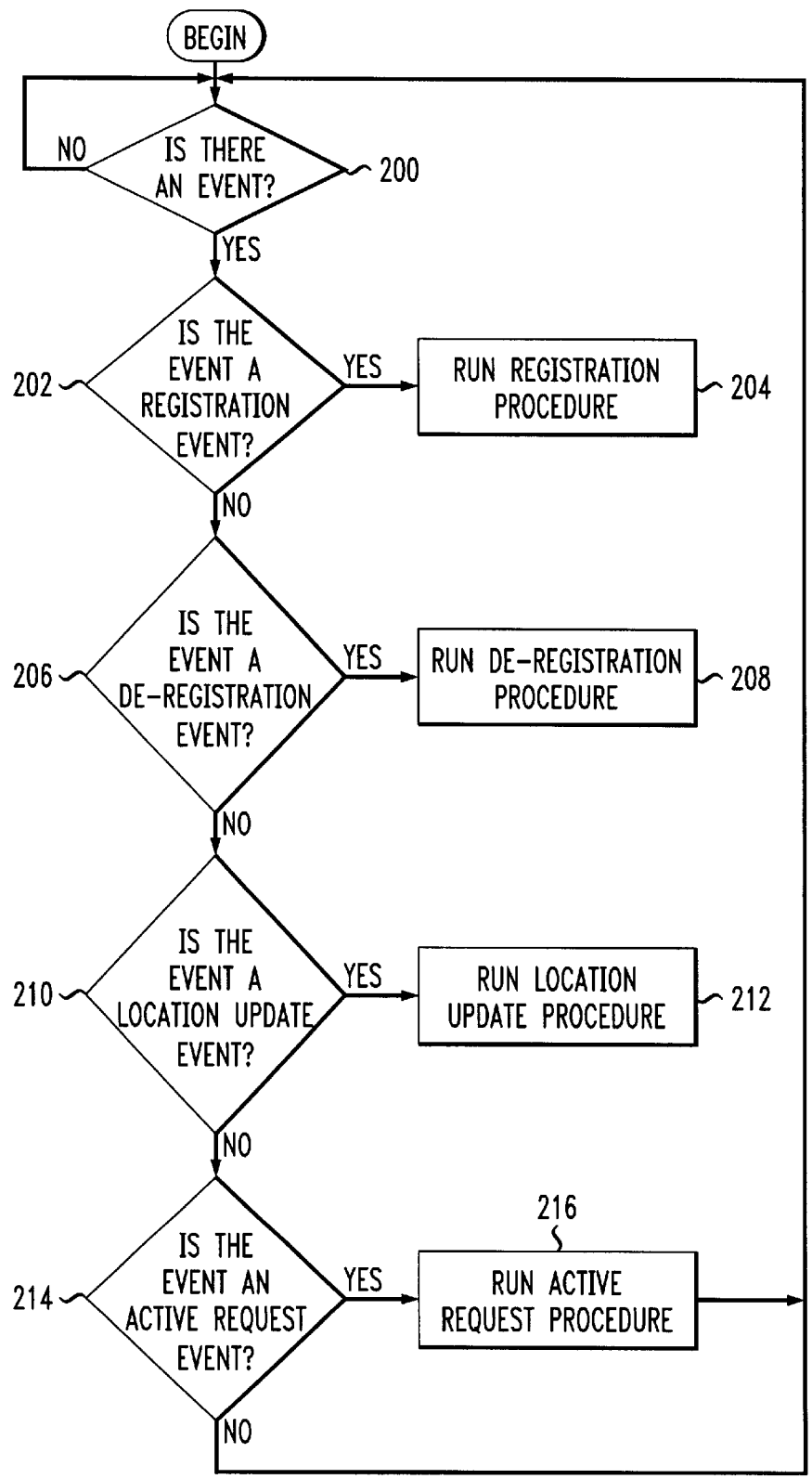
FIG. 8 shows an exemplary sequence of steps for responding to events in a message on-demand system in accordance with the present invention.

FIG. 8, in combination with FIGS. 1–3, show an exemplary sequence of steps for transmitting on demand multicast messages in accordance with the present invention. In general, a local message server receives an event associated with a user. In one embodiment, events types include registration events, de-registration events, location update events, and active request events.

In step 200, it is determined whether the message server 106 has received an event. In step 202, it is determined whether the received event is a registration event. A registration event occurs when a user is first recognized by the mobile messaging system, such as at power up. In one embodiment, a local MSC becomes aware of the user and sends an indication to the local messaging server 106 coupled to the MSC.

Figure 9:
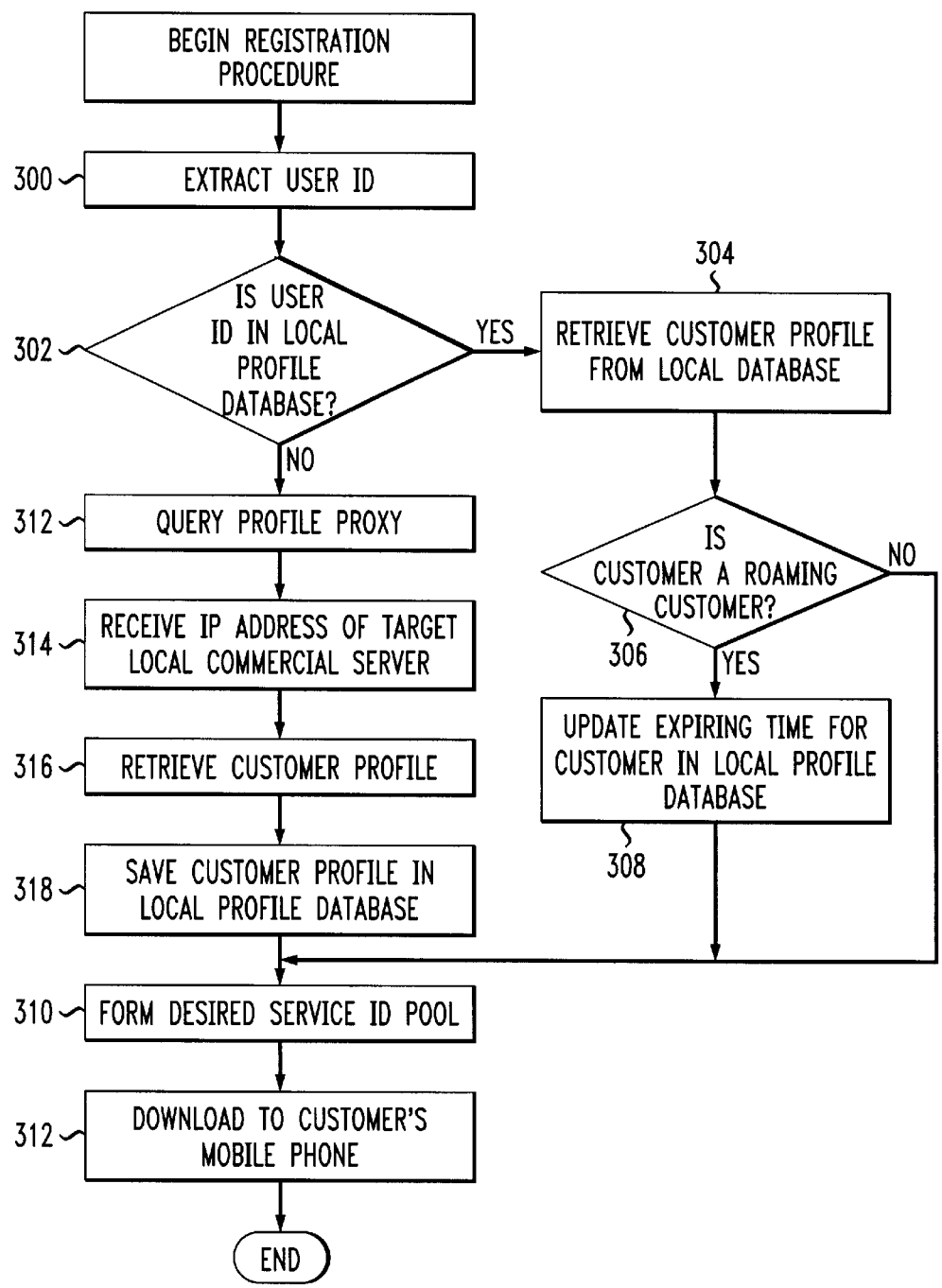
FIG. 9 shows an exemplary sequence of steps for handling registration events in an on-demand messaging system in accordance with the present invention.

In step 204, a registration procedure, which is described in detail in FIG. 9, is run to process the registration event. If the event was not a registration event, in step 206 the message server 106 determines whether the received event is a de-registration event. A de-registration event occurs when the MSC sends an indication to the messaging server 106 that a user is no longer registered with the mobile network, e.g., power down. In step 208, a de-registration procedure (see FIG. 10) is run for de-registration events. Similarly, steps 210 and 214 determine whether the received events are location update or active request events, respectively. In step 212, a location update procedure (see FIG. 11) is run for location update events and in step 216 an active request procedure (see FIG. 12) is run for active request events.

FIG. 8, in combination with FIGS. 1–3, show an exemplary sequence of steps for processing a registration event. In step 300, the user ID, such as the mobile subscriber identity (MSID) is extracted from the event message. The message server 106 determines, in step 302, whether the user ID is contained in the local user profile database 107 associated with the message server 106. If the user ID is found in the local user profile database, in step 304 the user profile is retrieved from the database. In step 306, the local message server 106 determines whether the user is a roaming user, and if so, updates an expiring time for the user in the profile database in step 308. If the user is not a roaming user, a desired service ID pool is formed in step 310, which is described more fully below.

If the user ID was not in the local profile database (step 302), the local message server 106 queries the profile proxy server 108 for the internet protocol (IP) address of the user in step 312. In step 314, the local message server 106 receives the IP address of a message server associated with the user, and in step 316, retrieves the user profile from the remote message server. The received user profile is then saved in the local message server user profile database in step 318.

In step 310, the local message server 106 forms a desired service ID pool for the user based upon the goods and/or services specified in the user's profile, as described above. In general, the desired service ID pool is formed by the local message server 106 from the user profile desired category and condition information. In step 312, the desired service pool ID is transmitted to the user and stored in the user's mobile phone.

For example, the four bytes of a user service ID 190 (FIG. 6) can be provided as follows: ([B4:category] [B3:first subcategory] [B2:second category] [B1:particular seller]) A user can specify preferences to receive messages from Fast Burger in the following manner: [B4:dining] [B3:fast food] [B2:drive through] [B1:Fast Burger]. It is understood that each byte corresponds to a predetermined value. It is further understood that "Fast Burger" is an imaginary fast food restaurant used for purposes of this example. The corresponding mask (in hexadecimal notation) can be as follows: [B4:FF] [B3:FF] [B2:FF] [B1:FF]. Since the user has specified a preference down to a particular seller, the mask contains all binary ones to pass the entire multicast message, as described below.

A user can also specify a broader preference to receive all messages from fast food sellers with the following service ID: [dining] [fast food] [no preference] [no preference]. The corresponding mask for the service ID is (in hexidecimal notation) [FF] [FF] [00] [00].

A multicast message contains four bytes indicating the seller's identity and category information. For example, a multicast message can have a format that is similar to the user service ID as follows: [B4: category] [B3: first subcategory] [B2: second subcategory] [B1: seller ID]. The multicast message is logically ANDed with user's ID mask.

For example, a message from Fast Burger can be provided as follows: [B4: restaurant] [B3: fast food] [B2: drive through] [B1: Fast Burger ID].

If the user has indicated that messages from Fast Burger should be received, the multicast message is logically ANDed with all ones. Thus, the multicast message is unchanged, i.e., unfiltered. The AND result is then compared to the user service ID. If the category (B4), first subcategory (B3), second subcategory (B2), and seller ID (B4) match, the message is received by the user's mobile phone.

As can be seen, fields, e.g., seller ID, for which the user did not specify a preference do not operate to block messages from any seller within the field. That is, a message is not blocked on the basis of the seller identified in the message if the user did not specify a preference for a particular seller.

In addition, the user conditions for receiving the message are also compared to information in the multicast message. The message server determines whether user conditions are satisfied. When a message server receives an event associated with the user, such as passing from one cell to another cell, the message server first determines whether the conditions specified in the user's profile are met. If they are not satisfied, the event is ignored. If the conditions are met, a count of possible sellers that meet the user's conditions is incremented. If the count exceeds a predetermined threshold, which can be specified by the seller, the message server initiates a predetermined action, such as sending a multicast message.

It is understood that other techniques for processing multicast messages will be readily apparent to one of ordinary skill in the art and are within the scope of the present invention.

Figure 10:
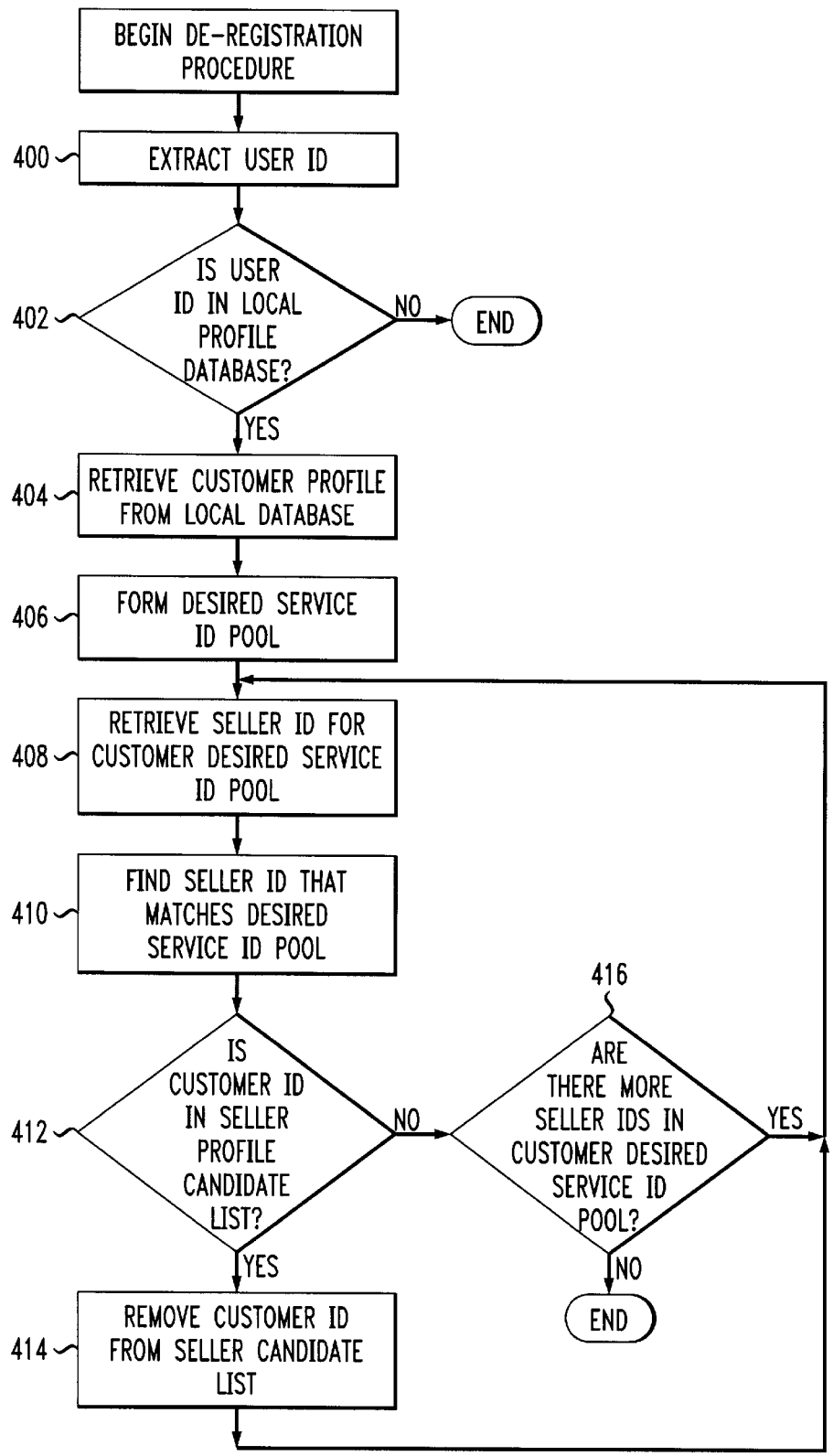
FIG. 10 shows an exemplary sequence of steps for handling de-registration events in an on-demand messaging system in accordance with the present invention.
Figure 11A:
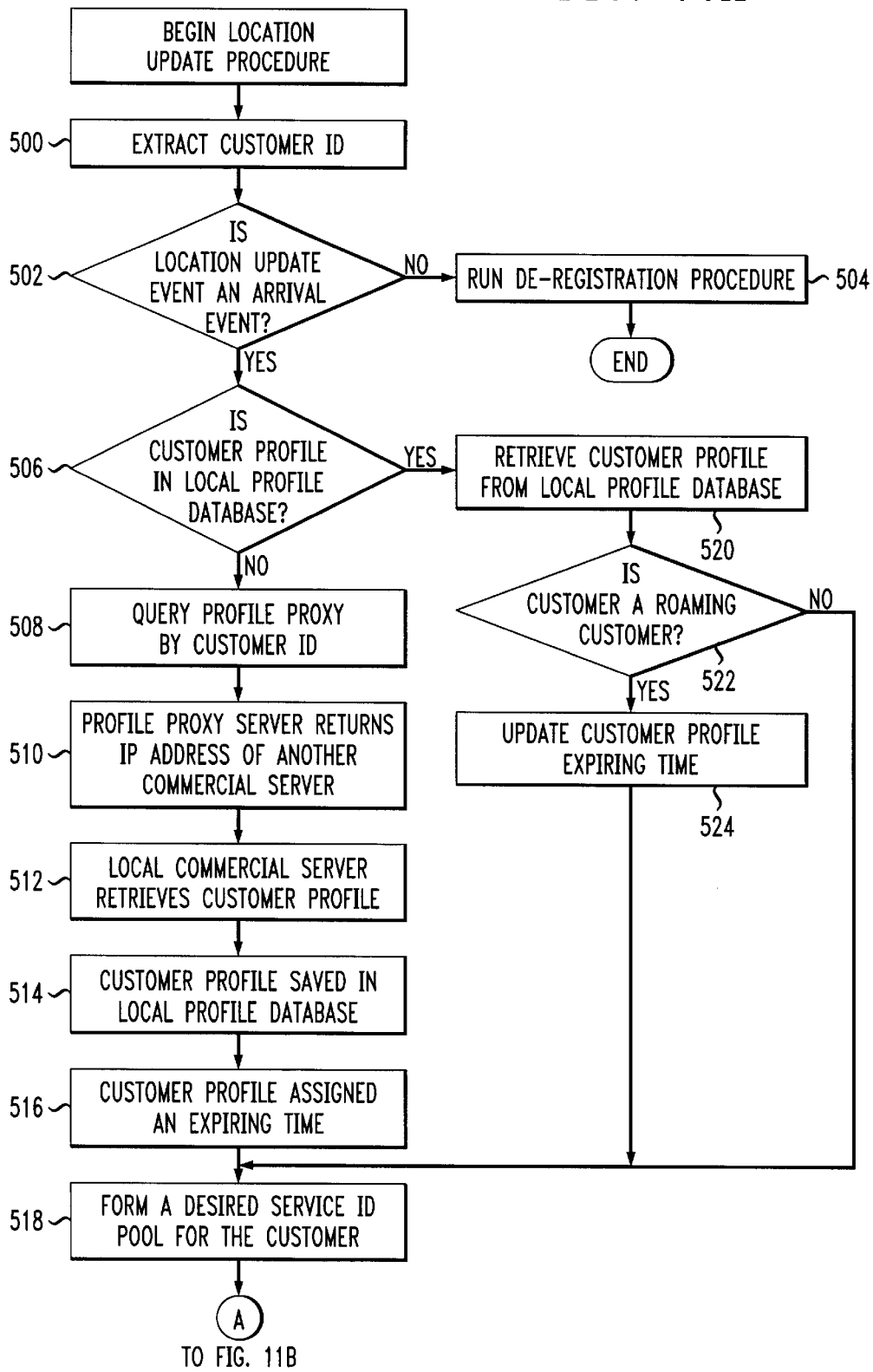
FIGS. 11A and 11B show an exemplary sequence of steps for handling location update events in an on-demand messaging system in accordance with the present invention.
Figure 11B:
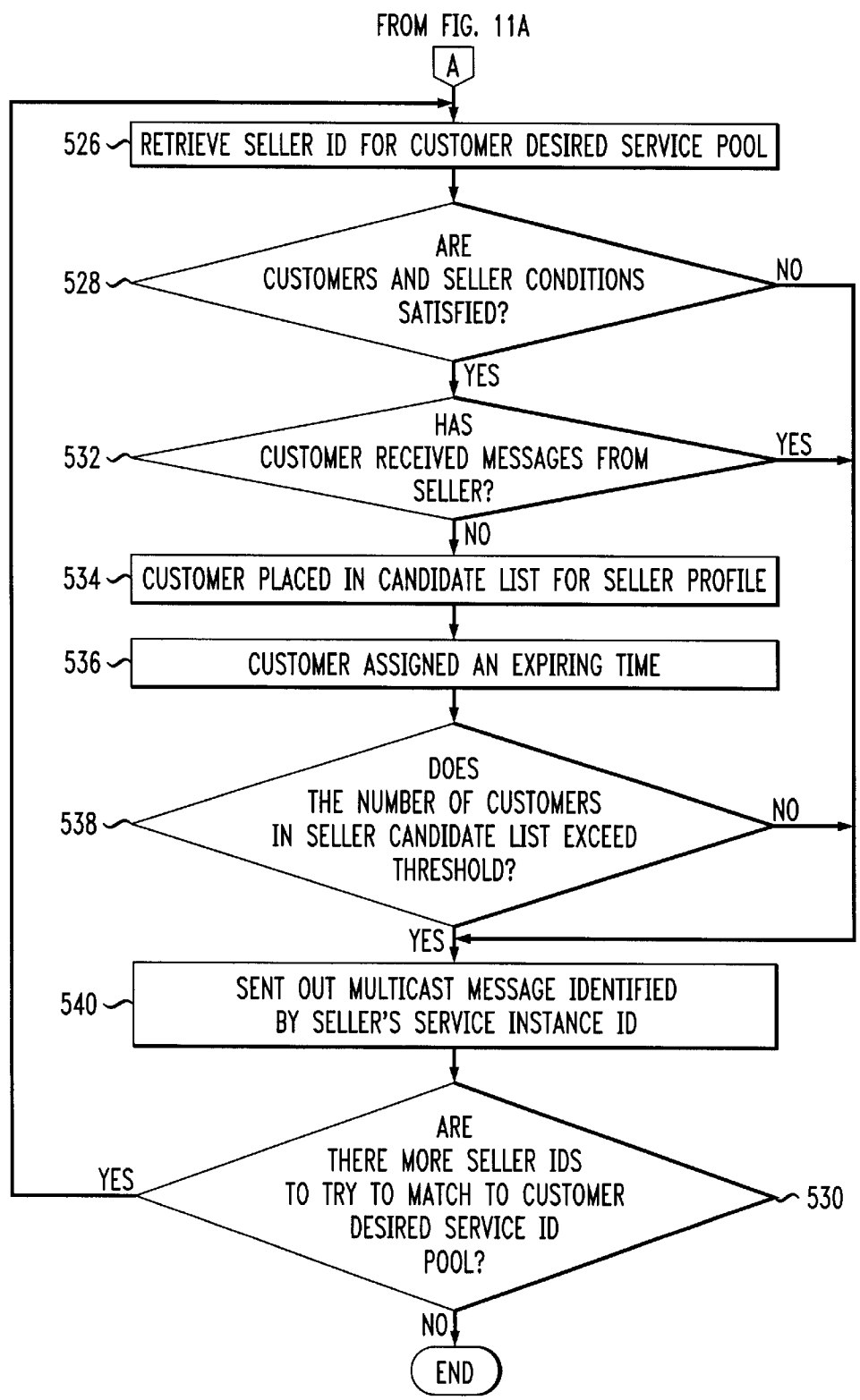

FIG. 10 shows an exemplary procedure for handling a de-registration event. In general, the user is removed from seller candidate lists. In step 400, the local message server extracts the user ID and in step 402 determines whether the user ID is in the local user profile database. Processing is terminated if the user ID is not in the local user profile database. If the user ID is in the local user profile database, in step 404 the user profile is retrieved and in step 406 a desired service ID for the user is formed.

In step 408, the local message server 106 finds a seller ID that matches a desired service ID in the pool. In step 410, the message server finds a seller ID matching an ID in the user's desired service ID pool. The seller profile candidate list, which is described below, is checked to determine whether the user ID is contained in the seller candidate list in step 412. If the user ID is found, in step 414 the user ID is removed from the seller candidate list. If the user ID is not found in the seller candidate list, in step 416 it is determined whether there are additional seller IDs to check against the user desired service ID pool.

FIG. 1 shows an exemplary sequence of steps for servicing a location update event. In step 500, the local message server 106 extracts the user ID and in step 502 determines whether the event is an arrival event. In step 504, the local message server 106 runs the de-registration procedure described above in conjunction with FIG. 10 if the event is not an arrival event, e.g., is a departure event.

In step 506, the local message server determines whether the user profile is in the local user profile database. Steps 508–514 and 520–524 are similar to steps 312–318 and 304–308, respectively, described above in conjunction with the registration procedure (FIG. 9) and will not be described further. In step 516, the local message server 106 assigns an expiration time to the user profile. A desired service ID pool for the user is formed in step 518.

In step 526, the seller ID for the user's desired service ID pool is retrieved from the local profile database. In step 528, the local message server determines whether the user conditions and the seller conditions are both satisfied. Exemplary user and seller conditions are set forth above. If the conditions are not satisfied, in step 530 it is determined whether additional seller IDs match IDs in the user desired service ID pool. If the conditions are satisfied, in step 532, the local message server determines whether the user has already received messages from the seller. If no prior messages were received, in step 534 the user ID is placed in a candidate list for the seller's profile. In step 536, the user profile is assigned an expiring time.

In step 538, the local message server 106 determines whether the number of users in the seller's candidate list exceeds a predetermined threshold. If not, further seller IDs are checked in step 530. If the threshold is exceeded, in step 540 a multicast message is transmitted by the base station associated with the message server. The multicast message is identified by the seller's service instance ID, as described in detail above.

Figure 12A:
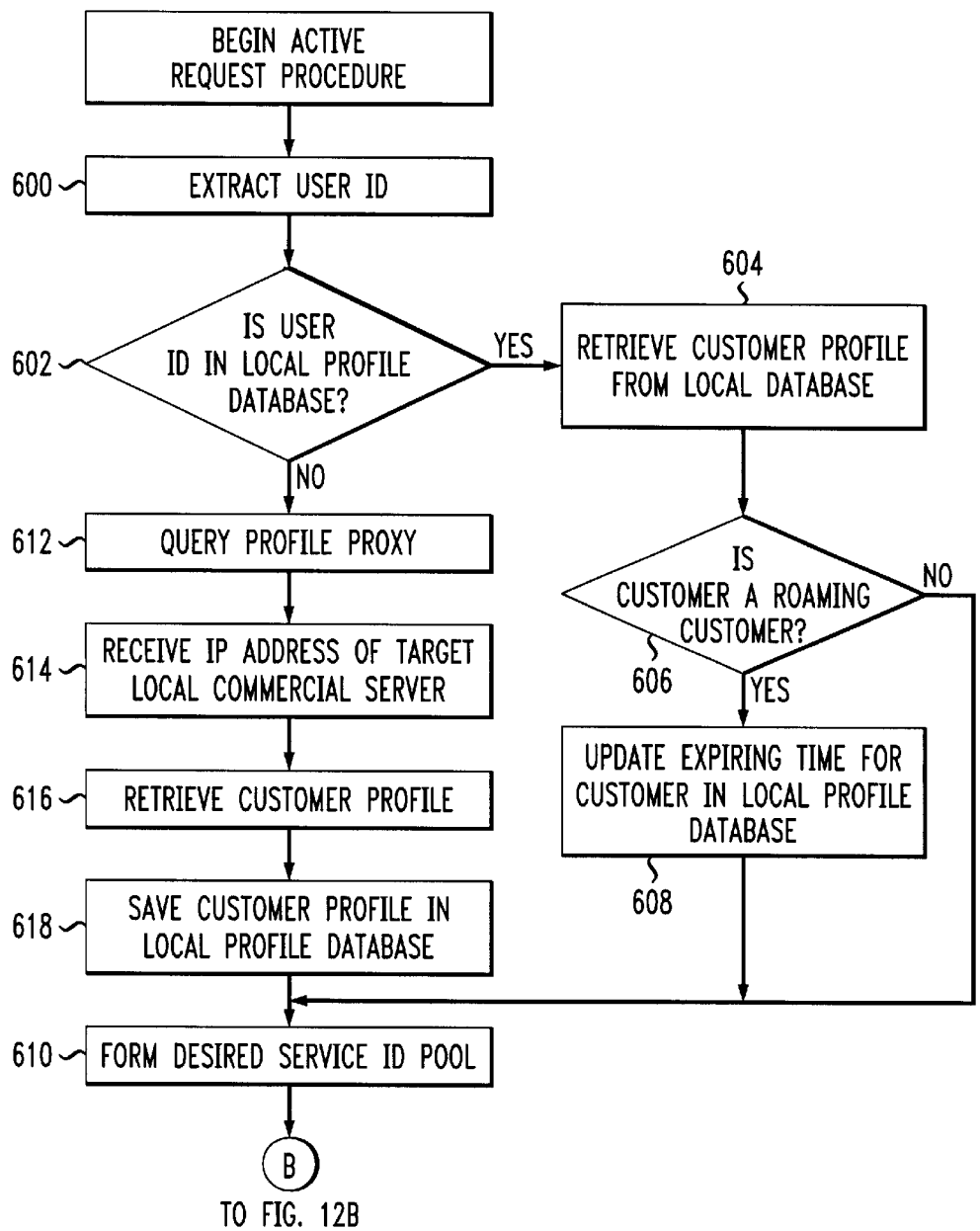
FIGS. 12A and 12B show an exemplary sequence of step for handling active request events in an on-demand messaging system in accordance with the present invention.
Figure 12B:
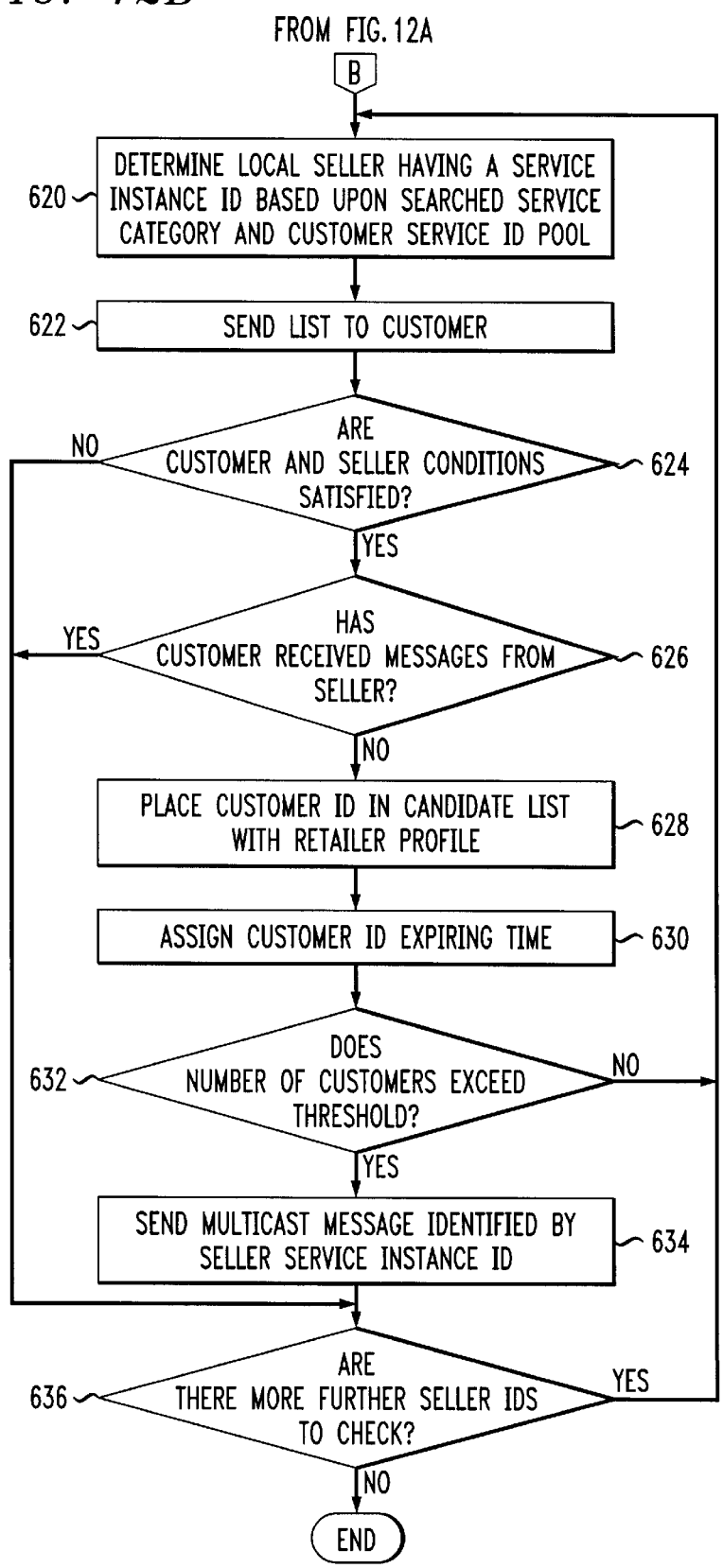

FIGS. 12A–B show an exemplary sequence of steps for the active request procedure. In general, an active request occurs in when a user requests information for goods/services within a category or subcategory. It is understood that the user can make a request in a variety of ways. For example, a predefined local information menu can be downloaded to the user's phone. In the menu, the "1" button on the phone can correspond to a dining category, the "2" button can correspond to an entertainment category, and so on. If the user wants to request information about local restaurants, the "1" button is pressed. The request event will be sent to the local message server via the wireless network. In turn, the message server responds with a list of sellers within the user's request category for display on the phone. In addition, the message server can further process this event to determine whether pre-defined commercial messages can be triggered and sent to nearby users.

Steps 600–618 are similar to steps 300–318 of FIG. 9 and are not described further. After the user's desired service ID pool is formed, in step 620 the local message server 106 determines a local seller that has a service instance ID that matches the category or subcategory from which the user has requested information and matches an ID within the user's desired service ID pool. In step 622, the list of matching local sellers is transmitted to the user.

In step 624, the local message server determines whether the customer and seller conditions are met. If the conditions are satisfied and the user has not previously received messages from that seller, as determined in step 626, the user ID is placed within a candidate list in the seller's profile in step 628. In step 630, an expiring time is assigned to the user ID. In step 632, the local message server compares the number of users to a predetermined threshold. If the threshold is exceeded, in step 634 a multicast message identified by the seller's service instance ID is transmitted. And in step 636, it is determined whether there are further seller IDs to be checked.

If the user and seller conditions are not met (step 624) or the user has already received messages from the seller (step 626), then in step 636 it is determined whether there are additional seller IDs to be checked.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of broadcasting messages to users of a mobile on-demand messaging system, comprising:

obtaining user profile information containing category and condition data for a user of the on-demand messaging system;

obtaining seller profile information containing category and condition data for a seller associated with the on-demand messaging system;

generating a desired service ID pool for a first user based upon the category and condition data in the user profile;

downloading the desired service ID pool to the first user;

generating a service instance ID for a first seller based upon the category data in the seller profile;

transmitting a multicast message from a base station currently serving the user, the multicast message containing seller category information.

2. The method according to claim 1, further including transmitting a multicast message in response to a user request to receive information regarding sellers within a particular category.

3. The method according to claim 1, further including transmitting a multicast message containing category, at least one subcategory, and seller ID information.

4. The method according to claim 1, wherein the user profile condition data includes at least one condition selected from the group consisting of time of day, maximum number of messages, day of the week, distance from seller, and type of message.

5. The method according to claim 1, further including transmitting multicast messages under conditions specified by a seller identified in the multicast message.

6. The method according to claim 5, further including transmitting the multicast message with at least one condition selected from the group consisting of time, day, and number of users proximate the seller.

7. The method according to claim 1, further including storing user profile information in a database associated with a message server local to a user's home location.

8. The method according to claim 7, further including contacting the message server via a profile proxy server.

9. The method according to claim 8, further including obtaining user information via the Internet.

10. The method according to claim 1, wherein the desired service ID pool includes at least one user service ID and at least one ID mask.

11. The method according to claim 10, further including determining whether the first user should process the multicast message based upon the user service ID, the ID mask, and the multicast message.

12. The method according to claim 11, further including logically ANDing the ID mask and a corresponding portion of the multicast message.

13. The method according to claim 12, further including comparing the logical AND to the user service ID.

14. The method according to claim 1, further including monitoring the location of the user.

15. The method according to claim 14, further including transferring the user profile information to a message server serving a cell in which the user is currently located from a message server with the user initially provided the profile information.

16. The method according to claim 15, further including transmitting multicast messages when a number of users proximate a particular seller becomes greater than a predetermined threshold.

17. The method according to claim 15, further including transmitting multicast messages when a number of users proximate a seller that is within a category for which the user has specified a preference to receive messages is greater than a predetermined threshold.

18. The method according to claim 17, wherein the seller can select the predetermined threshold.

* * * * *